US012719568B2

(12) United States Patent
Silverman et al.

(10) Patent No.: US 12,719,568 B2
(45) Date of Patent: Aug. 25, 2026

(54) COORDINATED CUSTOMIZATION OF HARVESTING CONDITIONS TO AMBIENT POWER DEVICES

(71) Applicant: Cisco Technology, Inc., San Jose, CA (US)

(72) Inventors: Matthew A. Silverman, Shaker Heights, OH (US); Sivadeep Reddy Kalavakuru, Akron, OH (US); Jerome Henry, Pittsboro, NC (US); Ardalan Alizadeh, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 391 days.

(21) Appl. No.: 18/487,056

(22) Filed: Oct. 14, 2023

(65) Prior Publication Data

US 2024/0380249 A1 Nov. 14, 2024

Related U.S. Application Data

(60) Provisional application No. 63/501,810, filed on May 12, 2023.

(51) Int. Cl.
*H04B 7/22* (2006.01)
*H02J 50/20* (2016.01)

(52) U.S. Cl.
CPC ................ *H04B 7/22* (2013.01); *H02J 50/20* (2016.02)

(58) Field of Classification Search
CPC .............. H04B 7/22; H02J 50/20; H02J 50/80
(Continued)

(56) References Cited

U.S. PATENT DOCUMENTS 11,670,969 B2 * 6/2023 Zeine ........................ H02J 7/02 320/108
12,457,630 B2 * 10/2025 Gupta ............... H02J 13/00002
(Continued)

FOREIGN PATENT DOCUMENTS

WO WO-2019067956 A1 * 4/2019 ............. H02J 50/20
WO 2023052155 A1 4/2023

OTHER PUBLICATIONS

International Search Report and Written Opinion for International Application No. PCT/US2024/028855, mailed Sep. 11, 2024, 12 Pages.

(Continued)

*Primary Examiner* — Mahendra R Patel
(74) *Attorney, Agent, or Firm* — Merchant & Gould P.C.

(57) ABSTRACT

Coordinated customization of harvesting conditions to ambient power devices may be provided. receive Radio Frequency (RF) characteristics associated with a backscatter communication device may be received. Based on the RF characteristics and a Received Signal Strength Indicator (RSSI) from the backscatter communication device, it may be determined that the computing device has an ability to charge the backscatter communication device to at least meet a predetermined energy need of the backscatter communication device. Next, in response to determining that the computing device has the ability to charge the backscatter communication device, charging of the backscatter communication device to at least meet the predetermined energy need of the backscatter communication device may be scheduled.

20 Claims, 3 Drawing Sheets

(58) Field of Classification Search
USPC .......................................................... 455/572
See application file for complete search history.

(56) References Cited

U.S. PATENT DOCUMENTS

| | | | | |
|---|---|---|---|---|
| 2014/0113561 | A1* | 4/2014 | Maguire | H04B 5/79 455/41.2 |
| 2016/0254844 | A1 | 9/2016 | Hull et al. | |
| 2018/0191191 | A1 | 7/2018 | Kaushik et al. | |
| 2020/0403459 | A1 | 12/2020 | Chowdhury et al. | |
| 2021/0194528 | A1* | 6/2021 | Zalewski | H04W 4/80 |
| 2022/0225402 | A1* | 7/2022 | Elkotby | H02J 50/001 |
| 2023/0014594 | A1* | 1/2023 | Lee | H02J 50/20 |
| 2023/0076409 | A1 | 3/2023 | Elkotby et al. | |
| 2024/0107447 | A1* | 3/2024 | Wang | H02J 50/80 |
| 2024/0175963 | A1* | 5/2024 | Fahim | H04W 4/029 |

OTHER PUBLICATIONS

Xu Y., et al., “ecUWB: A Energy-Centric Communication Scheme for Unstable WiFi Based Backscatter Systems”, 2020 29th International Conference on Computer Communications and Networks (ICCCN), IEEE, Aug. 3, 2020, 9 Pages, XP033833271, DOI: 10.1109/ICCCN49398.2020.9209721, figure 4, Sections IV-VI, figure 2, paragraphs [0020]-[0024] , [0026].

* cited by examiner

COORDINATED CUSTOMIZATION OF HARVESTING CONDITIONS TO AMBIENT POWER DEVICES

RELATED APPLICATION

Under provisions of 35 U.S.C. § 119(e), Applicant claims the benefit of U.S. Provisional Application No. 63/501,810 filed May 12, 2023, which is incorporated herein by reference.

TECHNICAL FIELD

The present disclosure relates generally to providing coordinated customization of harvesting conditions to ambient power devices.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
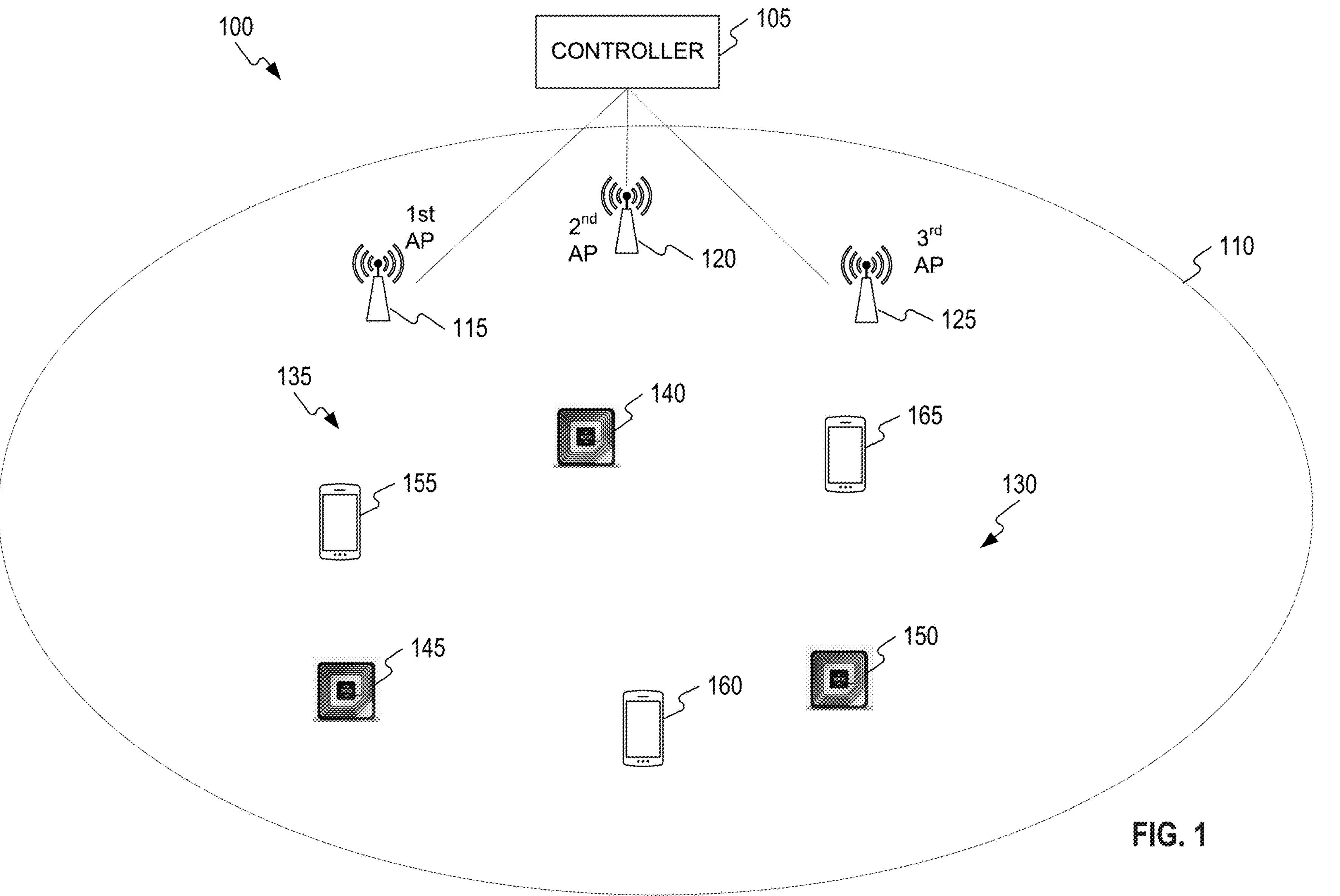
FIG. 1 is a block diagram of an operating environment for providing coordinated customization of harvesting conditions to ambient power devices.

Coordinated customization of harvesting conditions to ambient power devices may be provided. receive Radio Frequency (RF) characteristics associated with a backscatter communication device may be received. Based on the RF characteristics and a Received Signal Strength Indicator (RSSI) from the backscatter communication device, it may be determined that the computing device has an ability to charge the backscatter communication device to at least meet a predetermined energy need of the backscatter communication device. Next, in response to determining that the computing device has the ability to charge the backscatter communication device, charging of the backscatter communication device to at least meet the predetermined energy need of the backscatter communication device may be scheduled.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Backscatter Communication (i.e., BackCom) may use, light, ambient, or Radio Frequency (RF) energy to allow battery-less/very low-powered devices to communicate (e.g., at slow speed). For example, backscatter communication may be used for passive Radio Frequency Identification (RFID) tags. Internet-of-Things (IoT) sensors may be more and more ubiquitous, and they may be required to have battery power. This battery power requirement may increase maintenance costs. With backscatter communication, a sensor may be battery-less or use a very small battery that may last years harvesting RF energy.

One option for backscatter communication energy harvesting may be ambient RF harvesting. For IoT devices, charging times may depend on how close RF sources are for energy harvesting. An example charging may be 0.4 μW to 60 μW if the transmitting RF is within 15 meters and is transmitting at 30 dBm with 6 dBi antenna. A fully charged capacitor of 24 μF, for example, may drive a backscatter communication IoT device for 3.6 seconds (e.g., 1.5 V and 10 μA may be assumed). A solid-state battery of 1 μAh at 1.5V may drive the backscatter communication IoT devices for 6 minutes (1.5V and 10 μA may be assumed).

Battery life may be a common issue for IoT devices supporting Wi-Fi. Ambient RF energy may be harvested to power battery-less or battery-powered devices. There may, however, be variability in particular RF charging characteristics. In general, backscatter communication devices (i.e., Ambient Power (AMP) devices) may try to have a wideband frequency response for its ambient charging. However, due to matching and RF variation in component parts, that response may not be efficient. Instead, there may be a range of frequencies that may yield better results. If this is known by the network for each backscatter communication device and in aggregate, the network may plan ways to supply ambient power in ways that may allow for faster charging of backscatter communication devices.

Accordingly, each backscatter communication device may have different frequencies it responds to better to harvest energy. Embodiments of the disclosure may schedule traffic across its APs in a way that best supports harvesting for its backscatter communication devices. The backscatter communication devices may communicate specific messages to the network to provide this process.

FIG. 1 shows an operating environment 100 for providing coordinated customization of harvesting conditions to ambient power devices. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN) for devices. The plurality of APs may comprise a first AP 115, a second AP 120, and a third AP 125. Each of the plurality of APs may be compatible with specification standards such as, but not limited to, the Institute of Electrical and Electronics Engineers (IEEE) 802.11 specification standard for example.

A first plurality of devices 130 and a second plurality of devices 135 may be deployed in coverage environment 110. The plurality of APs may provide wireless network access to first plurality of devices 130 and second plurality of devices 135 as the devices move within coverage environment 110. Coverage environment 110 may comprise an outdoor or indoor wireless environment for Wi-Fi or any type of wireless protocol or standard.

First plurality of devices 130 may comprise a first device 140, a second device 145, and a third device 150. First plurality of devices 130 may comprise backscatter communication devices, for example, RFID tags. First plurality of devices 130 may comprise, but are not limited to, general energy harvesting devices and pure backscatter communication devices. General energy harvesting devices may comprise devices that work in two phases: i) first harvesting RF energy for a time period; then ii) transmitting using this harvested RF energy. General energy harvesting devices may comprise battery-less Bluetooth Low Energy (BLE) chips for example. With a pure backscatter communication device, the RF signal that provides power may also be the one that is backscattered/modified according to some modulation hence encoding some symbols of information. In addition, first plurality of devices 130 may comprise devices that may receive or harvest energy from light energy and then use the energy from light to power transmission. First plurality of devices 130 may also comprise devices that may harvest RF energy to recharge a battery or other energy storage element within the device.

Second plurality of devices 135 may comprise a first client device 155, a second client device 160, and a third client device 165. Ones of second plurality of devices 135 may comprise, but are not limited to, a smart phone, a personal computer, a tablet device, a mobile device, a telephone, a remote control device, a set-top box, a digital video recorder, an Internet-of-Things (IoT) device, a network computer, a router, an AR/VR device an Automated Transfer Vehicle (ATV), a drone, an Unmanned Aerial Vehicle (UAV), a smart wireless light bulb, or other similar microcomputer-based device.

Controller 105 may comprise a Wireless Local Area Network controller (WLC) and may provision and control coverage environment 110 (e.g., a WLAN). Controller 105 may allow the plurality of client devices to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide coordinated customization of harvesting conditions to ambient power devices.

The elements described above of operating environment 100 (e.g., controller 105, first AP 115, second AP 120, third AP 125, first device 140, second device 145, third device 150, first client device 155, second client device 160, and third client device 165) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
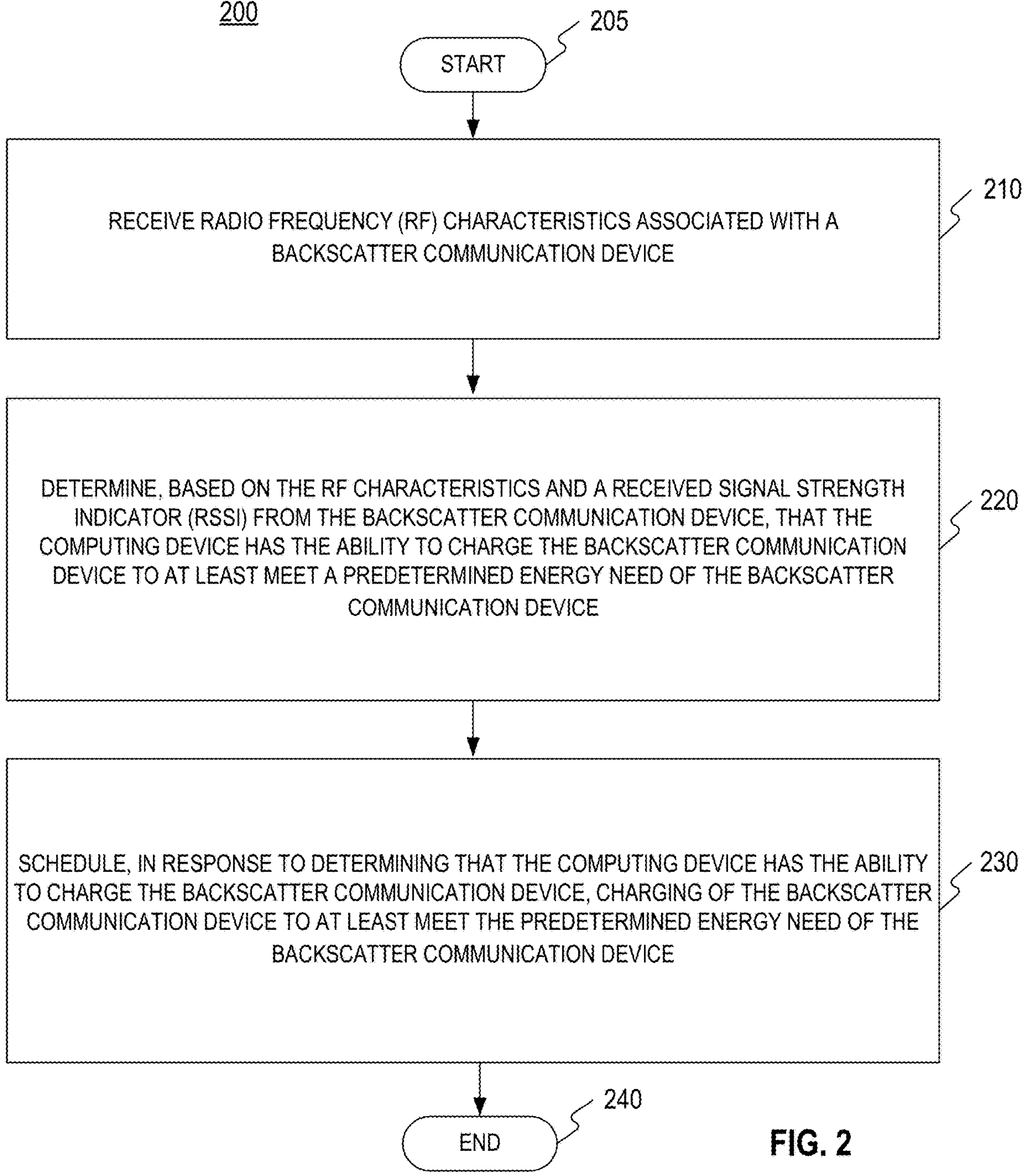
FIG. 2 is a flow chart of a method for providing coordinated customization of harvesting conditions to ambient power devices.

FIG. 2 is a flow chart setting forth the general stages involved in a method 200 consistent with embodiments of the disclosure for providing coordinated customization of harvesting conditions to ambient power devices. Method 200 may be implemented using a computing device 300 as described in more detail below with respect to FIG. 3. Computing device 300 may be embodied by controller 105 or any of the plurality of APs for example. Ways to implement the stages of method 200 will be described in greater detail below.

Method 200 may begin at starting block 205 and proceed to stage 210 where computing device 100 (e.g., first AP 115) may receive Radio Frequency (RF) characteristics associated with a backscatter communication device (e.g., first device 140). For example, Each backscatter communication device (e.g., first plurality of devices 130) may include as part of its payload a field that may contain RF characteristics. This may be included in an optional field if a flag in the signal field is set to include it. This also may comprise a standalone frame that the backscatter communication device may send less frequently. In another embodiment, the network may receive the information from a database (e.g., on controller 105) based, for example, on Media Access Control (MAC) addressing for the backscatter communication device. Regardless of the form of how the RF characteristics are transferred, the information transferred may comprise, but is not limited to: i) a harvesting efficiency comprising an efficiency of turning RF energy into Direct Current (DC) energy via an antenna and rectifier associated with the backscatter communication device; ii) a transmit repetition rate indicating how frequently the backscatter communication device desires to transmit; iii) a transmission duration; iv) a power dissipation per frame indicating how much energy each frame dissipates from power reserves of the backscatter communication device; and v) a charging capacity of the backscatter communication device (e.g., in terms of mW-min).

The harvesting efficiency may be used to determine a minimum power in order to harvest. For example, anything above-45 dBm for a given backscatter communication device may be harvested. Anything below-45 dBm may not be enough for the rectifier in the backscatter communication device to function for example.

The harvesting efficiency may be more detailed to include how efficiency varies with RF power input. Certain rectifiers may only be efficient at high powers, Schottky for example. In one embodiment, the harvesting efficiency may be in an M×N byte payload that covers M input power levels with a granularity of N bits. The M power level ranges may be predefined based on what may be typical or could be communicated explicitly in the frame. For example, for a single power level (e.g., from −30 dBm to −50 dBm): i) 0 may be 0% to 9%; ii) 1 may be 10% to 19%; iii) 2 may be 20% to 29%; and iv) 3 may be greater than or equal to 30%.

In another embodiment, the harvesting efficiency may be included in a bitmap that may show what bands or parts of the band it's harvesting response performs best. In yet another embodiment, the harvesting efficiency may be included in an M-long vector N-bit values that may indicate for different predetermined frequency ranges, where M may be the number of predetermined frequency ranges for a total payload size of M×N bits. For example this may be a 2 bit value that may represent an efficiency of conversion between RF and Direct Current (DC) that may span an efficiency range (e.g., 0%-40%). For example for the efficiency range: i) 0 may be 0% to 9%; ii) 1 may be 10% to 19%; iii) 2 may be 20% to 29%; and iv) 3 may be greater than or equal to 30%. For backscatter communication devices that have a battery, the backscatter communication device may have an action or management frame that may be used to poll the above information (i.e., RF characteristics) instead of including regularly in packets from the backscatter communication devices.

From stage 210, where computing device 100 receives the RF characteristics associated with the backscatter communication device (e.g., first device 140), method 200 may advance to stage 220 where computing device 100 may determine, based on the RF characteristics and a Received Signal Strength Indicator (RSSI) from the backscatter communication device (e.g., first device 140), that computing device 100 has the ability to charge the backscatter communication device to at least meet a predetermined energy need of the backscatter communication device. For example, the backscatter communication devices may charge at their normal, unaided rate. When they have enough charge, they may transmit. Eventually the backscatter communication devices may be heard by an AP (e.g., first AP 115). First AP 115 may decode and parse first device 140's RF characteristic payload and may share it with controller 105.

First AP 115 may then take the RSSI from the transmission received from first device 140 and the information in the RF characteristics payload and may determine if it may transmit RF energy to first device 140 in a way that it may charge first device 140. In other words, it may be determined if first AP 115 has the ability to charge first device 140 to at least meet the predetermined energy need of first device 140. If first AP 115 is close enough RF-wise to help, first AP 115 may add first device 140's harvesting response to the statistics of other backscatter communication devices it may help charge.

Once computing device 100 determines, based on the RF characteristics and the RSSI from the backscatter communication device that computing device 100 (e.g., first AP 115) has the ability to charge the backscatter communication device to at least meet the predetermined energy need of the backscatter communication device in stage 220, method 200 may continue to stage 230 where computing device 100 may schedule, in response to determining that computing device 100 has the ability to charge the backscatter communication device, charging of the backscatter communication device to at least meet the predetermined energy need of the backscatter communication device. For example, first AP 115 may use, for example, the RF characteristics (e.g., the information about the harvesting efficiency, transmit repetition rate, and maximum charge capacity) to schedule transmits across frequencies to ensure that each backscatter communication device may be charged in time to meet its repetition rate. This may be viewed as aggregate statistics on harvesting efficiency and may take advantage of where multiple backscatter communication devices share similar efficiencies for the same frequency ranges. First AP 115 may use it's scan radio to jump around and transmit at these frequencies in "charging dwells" or the service radio may do off channel transmissions.

Controller 105 may identify better AP matches for a particular backscatter communication device and send a notification to each AP to add/drop that device from its enhanced harvesting transmissions. If the network determines that there is a battery powered client device that is located near a particular backscatter communication device, the network may trigger some exchanges with the battery powered device to enhance the harvesting because it may be closer/louder. Once computing device 100 schedules, in response to determining that computing device 100 (e.g., first AP 115) has the ability to charge the backscatter communication device (e.g., first device 140), charging of the backscatter communication device to at least meet the predetermined energy need of the backscatter communication device in stage 230, method 200 may then end at stage 240.

Figure 3:
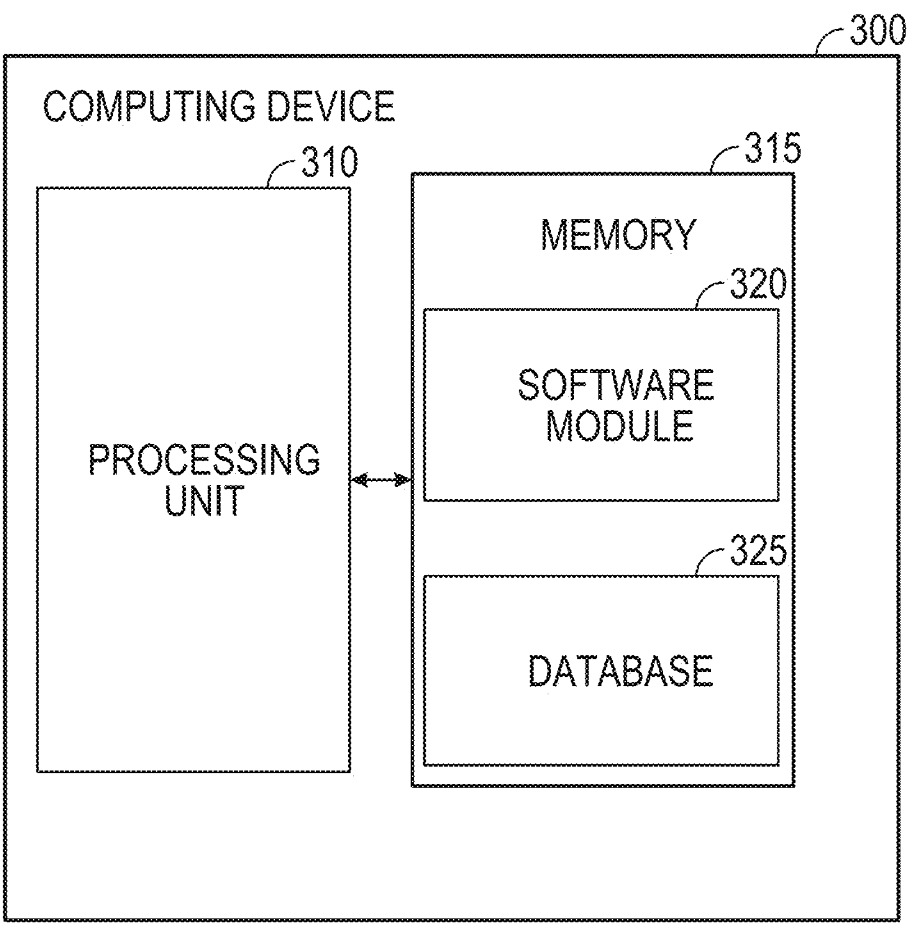
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing coordinated customization of harvesting conditions to ambient power devices as described above with respect to FIG. 2. Computing device 300, for example, may provide an operating environment for controller 105, first AP 115, second AP 120, third AP 125, first device 140, second device 145, third device 150, first client device 155, second client device 160, and third client device 165. Controller 105, first AP 115, second AP 120, third AP 125, first device 140, second device 145, third device 150, first client device 155, second client device 160, and third client device 165 may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:

receiving Radio Frequency (RF) characteristics associated with a backscatter communication device, wherein the RF characteristics comprises:

a power dissipation per frame indicating how much energy each frame dissipates from power reserves of the backscatter communication device, a charging capacity of the backscatter communication device, and the predetermined energy need ensures that the backscatter communication device is charged in time to meet a repetition interval of the backscatter communication device;

determining, by a computing device based on the RF characteristics from the backscatter communication device and a Received Signal Strength Indicator (RSSI) from a non-Access Point (AP) device, that the computing device has an ability to charge the backscatter communication device to at least meet a predetermined energy need of the backscatter communication device; and scheduling, in response to determining that the computing device has the ability to charge the backscatter communication device, charging of the backscatter communication device to at least meet the predetermined energy need of the backscatter communication device.

2. The method of claim 1, wherein the RF characteristics are received from the backscatter communication device.

3. The method of claim 1, wherein the RF characteristics are received from a database based on an address of the backscatter communication device.

4. The method of claim 1, wherein the RF characteristics comprise a harvesting efficiency comprising an efficiency of turning RF energy into Direct Current (DC) energy via an antenna and rectifier associated with the backscatter communication device.

5. The method of claim 1, wherein the RF characteristics comprise a transmit repetition rate indicating how frequently the backscatter communication device desires to transmit.

6. The method of claim 1, wherein the RF characteristics comprise a transmission duration.

7. The method of claim 1, wherein the computing device comprises an Access Point (AP).

8. A system comprising:

a memory storage; and a processing unit disposed in a computing device, the processing unit coupled to the memory storage, wherein the processing unit is operative to:

receive Radio Frequency (RF) characteristics associated with a backscatter communication device, wherein the RF characteristics comprises:

a power dissipation per frame indicating how much energy each frame dissipates from power reserves of the backscatter communication device, a charging capacity of the backscatter communication device, and the predetermined energy need ensures that the backscatter communication device is charged in time to meet a repetition interval of the backscatter communication device;

determine, based on the RF characteristics from the backscatter communication device and a Received Signal Strength Indicator (RSSI) from a non-Access Point (AP), that the computing device has an ability to charge the backscatter communication device to at least meet a predetermined energy need of the backscatter communication device; and schedule, in response to determining that the computing device has the ability to charge the backscatter communication device, charging of the backscatter communication device to at least meet the predetermined energy need of the backscatter communication device.

9. The system of claim 8, wherein the RF characteristics comprise a harvesting efficiency comprising an efficiency of turning RF energy into Direct Current (DC) energy via an antenna and rectifier associated with the backscatter communication device.

10. The system of claim 8, wherein the RF characteristics comprise a transmit repetition rate indicating how frequently the backscatter communication device desires to transmit.

11. The system of claim 8, wherein the RF characteristics comprise a transmission duration.

12. The system of claim 8, wherein the computing device comprises an Access Point (AP).

13. A non-transitory computer-readable medium that stores a set of instructions which when executed perform a method executed by the set of instructions comprising:

receiving Radio Frequency (RF) characteristics associated with a backscatter communication device, wherein the RF characteristics comprises:

a power dissipation per frame indicating how much energy each frame dissipates from power reserves of the backscatter communication device, a charging capacity of the backscatter communication device, and the predetermined energy need ensures that the backscatter communication device is charged in time to meet a repetition interval of the backscatter communication device;

determining, by a computing device based on the RF characteristics from the backscatter communication device and a Received Signal Strength Indicator (RSSI) from a non-Access Point (AP) device, that the computing device has an ability to charge the backscatter communication device to at least meet a predetermined energy need of the backscatter communication device; and scheduling, in response to determining that the computing device has the ability to charge the backscatter communication device, charging of the backscatter communication device to at least meet the predetermined energy need of the backscatter communication device.

14. The non-transitory computer-readable medium of claim 13, wherein the predetermined energy need ensures that the backscatter communication device is charged in time to meet a repetition interval of the backscatter communication device.

15. The non-transitory computer-readable medium of claim 13, wherein the RF characteristics comprise a harvesting efficiency comprising an efficiency of turning RF energy into Direct Current (DC) energy via an antenna and rectifier associated with the backscatter communication device.

16. The non-transitory computer-readable medium of claim 13, wherein the RF characteristics comprise a transmit repetition rate indicating how frequently the backscatter communication device desires to transmit.

17. The non-transitory computer-readable medium of claim 13, wherein the RF characteristics comprise a transmission duration.

18. The non-transitory computer-readable medium of claim 13, wherein the computing device comprises an Access Point (AP).

19. The method of claim 1, wherein the predetermined energy need ensures that the backscatter communication device is charged in time to meet a repetition interval of the backscatter communication device.

20. The system of claim 8, the predetermined energy need ensures that the backscatter communication device is charged in time to meet a repetition interval of the backscatter communication device.

* * * * *